(12) United States Patent
Kuromizu

(10) Patent No.: US 8,079,725 B2
(45) Date of Patent: Dec. 20, 2011

(54) DISPLAY DEVICE AND TV RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 155 days.

(21) Appl. No.: 12/601,010

(22) PCT Filed: Jan. 22, 2008

(86) PCT No.: PCT/JP2008/050751
§ 371 (c)(1),
(2), (4) Date: Nov. 20, 2009

(87) PCT Pub. No.: WO2008/146498
PCT Pub. Date: Dec. 4, 2008

(65) Prior Publication Data
US 2010/0149833 A1 Jun. 17, 2010

(30) Foreign Application Priority Data

May 31, 2007 (JP) ................................. 2007-145600

(51) Int. Cl.
*G09F 13/04* (2006.01)
(52) U.S. Cl. ...... 362/97.1; 362/97.4; 362/558; 362/634; 362/607
(58) Field of Classification Search ................. 362/97.1, 362/97.3, 97.4, 606, 558
See application file for complete search history.

(56) References Cited

U.S. PATENT DOCUMENTS

| | | | | |
|---|---|---|---|---|
| 5,729,310 A | * | 3/1998 | Horiuchi et al. | 349/62 |
| 2002/0149713 A1 | * | 10/2002 | Ishida et al. | 349/58 |
| 2005/0151894 A1 | * | 7/2005 | Katsuda et al. | 349/58 |
| 2006/0109643 A1 | * | 5/2006 | Chang | 362/97 |
| 2007/0002208 A1 | * | 1/2007 | Kim et al. | 349/58 |
| 2009/0268121 A1 | * | 10/2009 | Hisada | 349/58 |

FOREIGN PATENT DOCUMENTS

| | | |
|---|---|---|
| JP | 2002-311418 A | 10/2002 |
| JP | 2005-276716 A | 10/2005 |
| JP | 2005-285714 A | 10/2005 |
| JP | 2006-084615 A | 3/2006 |
| JP | 2006-146126 A | 6/2006 |
| JP | 2006-215512 A | 8/2006 |
| WO | 2007/049379 A1 | 5/2007 |

OTHER PUBLICATIONS

Official Communication issued in corresponding European Patent Application No. 08 710 559.9, mailed on Mar. 10, 2011.
Official Communication issued in International Patent Application No. PCT/JP2008/050751, mailed on Apr. 22, 2008.

* cited by examiner

*Primary Examiner* — Ali Alavi
(74) *Attorney, Agent, or Firm* — Keating & Bennett, LLP

(57) ABSTRACT

A display device includes a light source, a diffusion-plate arranged to diffuse light emitted from the light source, a supporting base arranged to support the diffusion plate, an optical sheet disposed on the diffusion plate, a diffusion-plate retainer fitted to the supporting base and arranged to sandwich the diffusion plate with the supporting base by pressing the diffusion plate while avoiding the optical sheet, and a display panel facing the diffusion plate.

9 Claims, 5 Drawing Sheets

DISPLAY DEVICE AND TV RECEIVER

BACKGROUND OF THE INVENTION

1. Field of the Invention

The present invention relates to a display device and a television receiver equipped with a diffusion plate facing a display panel such as a liquid crystal panel.

2. Description of the Related Art

A conventional display device such as a television receiver is disclosed in JP-A-2005-276716 (See, for example, pages 4 and 5, and FIG. 1 of this reference). The display device is provided with an illumination apparatus on the rear side of a display panel such as a liquid crystal panel. The illumination apparatus has a light source and a diffusion plate, each supported by a chassis. The diffusion plate is disposed so as to face the display panel, and diffuses light emitted from the light source provided on the rear side so as to direct it to the display panel.

At a light-emitting side of the diffusion plate, there is provided an optical sheet such as a lens sheet or a prism sheet. The diffusion plate and the optical sheet are retained by sandwiching peripheral portions thereof between a metal retainer fitted to the chassis and the chassis. Thus, the diffusion plate and the optical sheet are integrally fitted to the chassis.

When the light source is turned on, the optical sheet stretches due to a rise in temperature; the optical sheet is thus wrinkled with a strong pressing force produced by the metal retainer, causing a portion of a display image to be dark on the display panel. To cope with this, a gap is provided between the metal retainer and the optical sheet, making it possible to retain the optical sheet so as to freely stretch and contract, so as to obtain satisfactory images.

With the aforementioned conventional display device, however, if increased in size, the diffusion plate is warped with a rise in temperature caused by turning on the light source. FIGS. 16A and 16B are perspective views each showing how the diffusion plate is warped. Owing to a rise in temperature, the diffusion plate 10 may be warped to be formed in a cylinder-like shape (FIG. 16A), or in a saddle-like shape (FIG. 16B), so that a central portion thereof protrudes or is recessed toward the display panel.

Being increasingly warped, the diffusion plate comes into contact with the metal retainer so as to cause it to be elastically deformed. As a result, the diffusion plate may be brought into contact with the display panel. Moreover, the optical sheet is sandwiched between the warped diffusion plate and the metal retainer, and the optical sheet that is stretched due to a rise in temperature is thus wrinkled. This disadvantageously makes it impossible to obtain satisfactory display images. By forming the metal retainer with a member having great rigidity, it is possible to prevent warpage of the diffusion plate, but it is impossible to eliminate wrinkling of the optical sheet.

SUMMARY OF THE INVENTION

Accordingly, preferred embodiments of the present invention provide a display device that can produce satisfactory images, and a television receiver equipped with such a display device.

According to a preferred embodiment of the present invention, a display device includes a light source, a diffusion plate arranged to diffuse light emitted from the light source, a supporting base arranged to support the diffusion plate, an optical sheet disposed on the diffusion plate, a diffusion-plate retainer fitted to the supporting base and arranged to sandwich the diffusion plate with the supporting base by pressing the diffusion plate while avoiding the optical sheet, and a display panel facing the diffusion plate.

With this construction, the light emitted from the light source is incident on the diffusion plate so as to be diffused thereby. The light departing from the diffusion plate is then incident on the optical sheet, such as a lens sheet or a prism sheet, so as to be focused thereby. The display panel is irradiated with the light emitted from the optical sheet so that images are displayed on the display panel so as to be viewable. The diffusion-plate retainer is fitted to the supporting base supporting the diffusion plate, and the diffusion plate is sandwiched between the supporting base and the diffusion-plate retainer. The diffusion-plate retainer presses the diffusion plate while avoiding the optical sheet, so that the optical sheet is retained so as to freely stretch and contract. The diffusion plate, which increases its temperature by turning on the light source, is thus prevented from being warped, thanks to the diffusion-plate retainer.

Moreover, according to a preferred embodiment of the present invention, in the display device constructed as described above, the diffusion plate is preferably arranged to be slidable relative to the diffusion-plate retainer. With this construction, the diffusion plate is retained so as to freely stretch and contract, so that the diffusion plate, which increases its temperature by turning on the light source, is allowed to expand and thus slide together with the diffusion-plate retainer.

Moreover, according to a preferred embodiment of the present invention, in the display device constructed as described above, a portion of the diffusion-plate retainer that makes contact with the diffusion plate is preferably made of resin. With this construction, the resin portion of the diffusion-plate retainer is allowed to slide together with the diffusion plate. The diffusion-plate retainer may preferably be formed of resin, or may preferably be partially formed of resin.

Moreover, according to a preferred embodiment of the present invention, in the display device constructed as described above, the diffusion-plate retainer is arranged to make line or point contact with the diffusion plate.

Moreover, according to a preferred embodiment of the present invention, in the display device constructed as described above, the diffusion-plate retainer includes a rotatable roller that makes contact with the diffusion plate.

Moreover, according to a preferred embodiment of the present invention, in the display device constructed as described above, the diffusion-plate retainer is preferably formed of metal or metal compound.

Moreover, according to a preferred embodiment of the present invention, in the display device constructed as described above, the diffusion-plate retainer has a surface thereof painted in whitish or black color. Examples of the whitish color include not only white but also pale yellow and the like.

Moreover, according to a preferred embodiment of the present invention, in the display device constructed as described above, the diffusion-plate retainer has an urging member arranged to provide an urging force in a direction of pressing the diffusion plate. With this construction, the diffusion plate is pressed against a supporting member by an urging force of the urging member.

Moreover, according to a preferred embodiment of the present invention, the display device constructed as described above further includes an optical-sheet retainer fitted to the supporting base at a position different from that of the diffusion-plate retainer, wherein the diffusion plate and the optical sheet are sandwiched between the supporting base and the optical-sheet retainer, and a pressing force of the optical-sheet retainer is smaller than that of the diffusion-plate retainer. With this construction, the optical-sheet retainer is disposed at a position different from that of the diffusion-plate retainer so as to press the diffusion plate and the optical sheet. The pressing force of the optical-sheet retainer is smaller than that of the diffusion-plate retainer, and the optical sheet is thus retained so as to freely stretch and contract. The optical sheet may be free from the pressing force of the optical-sheet retainer.

Moreover, a television receiver according to a preferred embodiment of the present invention is provided with the display device constructed as described device.

According to various preferred embodiments of the present invention, the diffusion-plate retainer presses the diffusion plate while avoiding the optical sheet so as to sandwich the diffusion plate; thus, by pressing the diffusion plate with the diffusion-plate retainer having great rigidity, it is possible to prevent warpage of the diffusion plate caused by a rise in temperature. Meanwhile, the optical sheet is not pressed by the diffusion-plate retainer, and can thus be disposed so as to freely stretch and contract, making it possible to prevent wrinkling of the optical sheet caused by a rise in temperature. Thus, even with the diffusion plate being increased in size, it is still possible to obtain satisfactory display images.

Moreover, according to a preferred embodiment of the present invention, the diffusion plate is preferably slidable relative to the diffusion-plate retainer. Thus, it is possible to prevent deformation, as a result of expansion, of the diffusion plate when increasing its temperature with the light source being turned on.

Moreover, according to a preferred embodiment of the present invention, a portion of the diffusion-plate retainer that makes contact with the diffusion plate is preferably formed of resin. Thus, it is possible to easily make the diffusion plate slidable relative to the diffusion-plate retainer.

Moreover, according to a preferred embodiment of the present invention, the diffusion-plate retainer is preferably arranged to make line or point contact with the diffusion plate. Thus, it is possible to easily make the diffusion plate slidable relative to the diffusion-plate retainer.

Moreover, according to a preferred embodiment of the present invention, the diffusion-plate retainer preferably includes a rotatable roller that makes contact with the diffusion plate. Thus, it is possible to easily make the diffusion plate slidable relative to the diffusion-plate retainer.

Moreover, according to a preferred embodiment of the present invention, the diffusion-plate retainer is preferably formed of metal or metal compound. Thus, it is possible to easily obtain a diffusion-plate retainer having high rigidity. Thus, it is possible to easily prevent warpage of the diffusion plate. In addition, it is possible to form a shape exhibiting a certain degree of elasticity that permits the diffusion plate to slide, while having rigidity that helps prevent warpage of the diffusion plate.

Moreover, according to a preferred embodiment of the present invention, the diffusion-plate retainer preferably includes a surface thereof painted in whitish or black color. Thus, it is possible to prevent degraded image quality when the display screen is viewed from an oblique direction.

Moreover, according to a preferred embodiment of the present invention, the diffusion-plate retainer preferably includes an urging member arranged to provide an urging force in a direction of pressing the diffusion plate. This helps reduce a variation in a pressing force of the diffusion-plate retainer, thus making it possible to surely prevent warpage of the diffusion plate.

Moreover, according to a preferred embodiment of the present invention, a pressing force produced by the optical-sheet retainer pressing the optical sheet at a position different from that of the diffusion-plate retainer is smaller than that of the diffusion-plate retainer. Thus, it is possible to easily retain the optical sheet so as to freely stretch and contract, and to surely prevent wrinkling of the optical sheet caused by a rise in temperature.

Other features, elements, steps, characteristics and advantages of the present invention will become more apparent from the following detailed description of preferred embodiments of the present invention with reference to the attached drawings

DETAILED DESCRIPTION OF THE PREFERRED EMBODIMENTS

Figure 1:
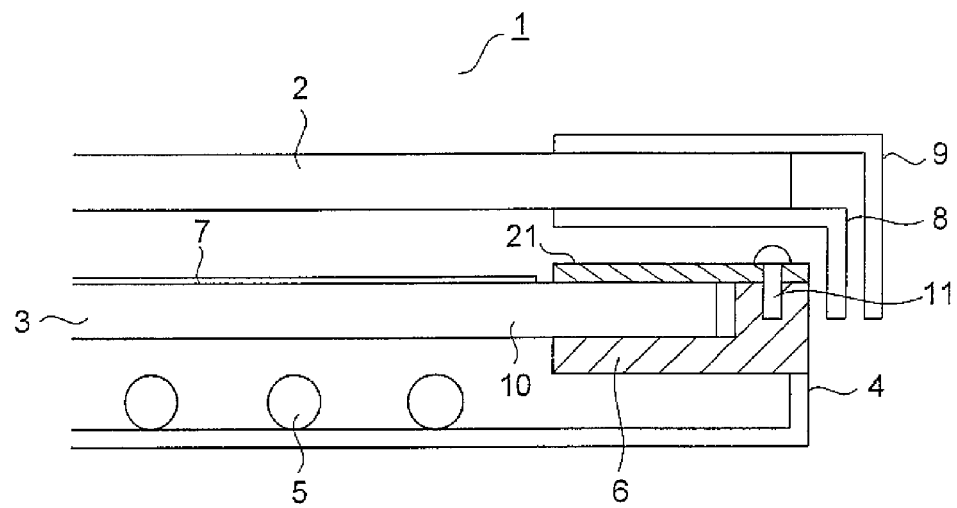
FIG. 1 is a side sectional view of a display device of a first preferred embodiment of the present invention.

Hereinafter, preferred embodiments of the present invention will be described with reference to the accompanying drawings. FIG. 1 is a side sectional view of a display device according to a first preferred embodiment. A display device 1 preferably includes an illumination apparatus 3 that is disposed on the rear side of a display panel 2 such as a liquid crystal panel. The display panel 2 has a plurality of pixels arranged in a matrix, and light emitted from the illumination apparatus 3 transmits a predetermined pixel of the display panel 2, so that images are displayed thereon.

The illumination apparatus 3 is provided with a back chassis 4 covering the rear side of the illumination apparatus 3, and a light source 5 is held by the back chassis 4. The light source 5 preferably includes a plurality of tubular fluorescent tubes that are arranged at a predetermined interval. The light source 5 may preferably include a meandering fluorescent tube, for example.

The back chassis 4 is provided integrally with a supporting base 6 supporting a diffusion plate 10. The diffusion plate 10 preferably includes a plate-shaped light-transmissive member holding a diffusing material, and diffuses light emitted from the light sources 5. The diffusion plate 10 is disposed on the supporting base 6, and is pressed at a peripheral portion thereof by diffusion-plate retainers 21 that are attached to the supporting base 6 by screws 11, for example. Thus, the diffusion plate 10 is sandwiched between the supporting base 6 and the diffusion-plate retainers 21.

The diffusion-plate retainer 21 is preferably made of a metal or metal compound plate having great rigidity, and thus exhibits a low elastic deformation behavior even if pressed by the diffusion plate 10 when thermally deformed. Moreover, the diffusion-plate retainers 21 are screwed down by the screws 11, for example, so as to produce a pressing force that permits the diffusion plate 10 to be slidable thereon. Thus, the diffusion plate 10 is allowed to slide when expanding due to heat.

On the diffusion plate 10, there is provided an optical sheet 7 such as a prism sheet or a lens sheet. By the optical sheet 7, light departing from the diffusion plate 10 is focused within a predetermined view angle. The optical sheet 7 is retained by optical-sheet retainers 12 (see FIG. 2), which will be described later. The display panel 2 is sandwiched between a frame 8, which is fitted to the back chassis 4, and a front chassis 9, and is so disposed as to face the diffusion plate 10.

Figure 2:
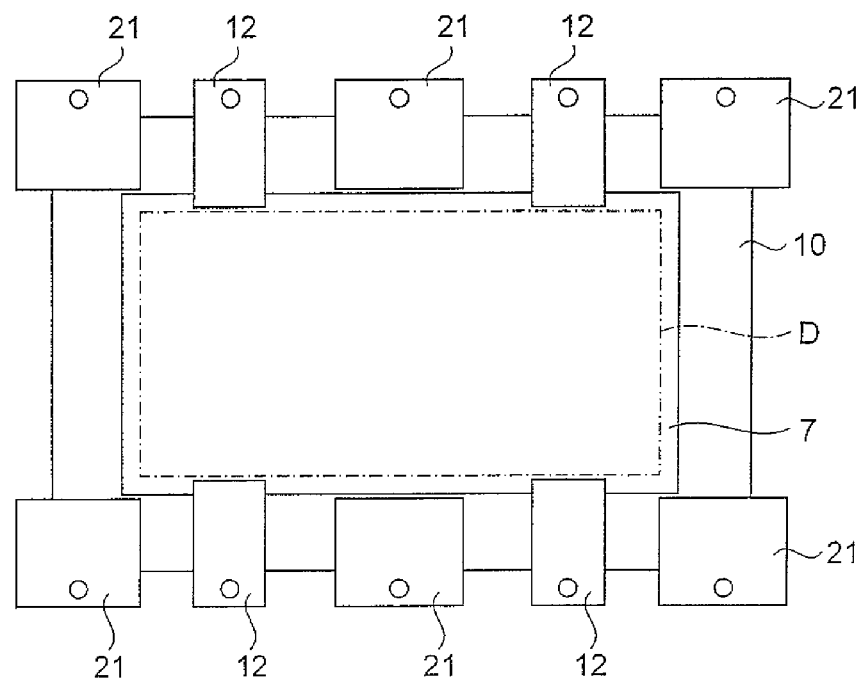
FIG. 2 is a plan view of a diffusion plate of the display device of the first preferred embodiment of the present invention.

FIG. 2 is a plan view of the diffusion plate 10. The diffusion plate 10 preferably has a rectangular or substantially rectangular shape as seen in a plan view, and is pressed at a plurality of points for each side thereof by the diffusion-plate retainers 21. The optical sheet 7 has an area smaller than the diffusion plate 10, and is disposed inward relative to the diffusion-plate retainers 21. Thus, the diffusion-plate retainers 21 press the diffusion plate 10 while avoiding the optical sheet 7. In the figure, D represents a display screen of the display panel 2.

At the peripheral portion of the optical sheet 7, the optical-sheet retainers 12 are provided. The optical-sheet retainers 12 are disposed at positions different from where the diffusion-plate retainers 21 are disposed, and are attached on the supporting base 6 (see FIG. 1). Thus, the diffusion plate 10 and the optical sheet 7 are sandwiched between the supporting base 6 and the optical-sheet retainers 12. A pressing force with which the optical-sheet retainers 12 press the optical sheet 7 is preferably smaller than the pressing force with which the diffusion-plate retainers 21 press the diffusion plate 10. Thus, the optical sheet 7 is allowed to freely stretch and contract due to thermal expansion and thermal contraction. Between the optical-sheet retainers 12 and the optical sheet 7, a gap may be provided so as to allow the optical sheet to be free from a pressing force produced by the optical-sheet retainers 12.

In the display device 1 constructed as described above, light emitted from the light sources 5 enters the diffusion plate 10. The light incident on the diffusion plate 10 is diffused, and the light so diffused then enters the optical sheet 7. The light incident on the optical sheet 7 is directed in a range of a desired view angle, and is emitted therefrom to irradiate the display panel 2. This enables images on the display screen D of the display panel 2 to be visually recognized.

According to this preferred embodiment, the diffusion-plate retainers 21 press the diffusion plate 10 while avoiding the optical sheet 7 so as to sandwich the diffusion plate 10. Thus, by pressing the diffusion plate 10 with the diffusion-plate retainers 21 having great rigidity, it is possible to prevent warpage of the diffusion plate 10 caused by a rise in temperature when the light source 5 is turned on. Meanwhile, the optical sheet 7 is not pressed by the diffusion-plate retainers 12, and can thus be disposed so as to freely stretch and contract. This makes it possible to prevent wrinkling of the optical sheet 7 caused by a rise in temperature. Thus, even with the diffusion plate increased in size, it is still possible to obtain satisfactory display images.

Moreover, the diffusion plate 10 is preferably arranged to be slidable relative to the diffusion-plate retainers 21. Thus, it is possible to prevent the diffusion plate 10 from being deformed such that a central portion thereof is bulged as a result of expansion when increasing its temperature with the light source 5 being turned on.

Moreover, the pressing force of the optical-sheet retainers 12 pressing the optical sheet 7 at positions different from where the diffusion-plate retainers 21 are disposed is preferably smaller than that of the diffusion-plate retainers 21. Thus, it is possible to easily retain the optical sheet 7 so as to freely stretch and contract, and to surely prevent wrinkling of the optical sheet 7 caused by a rise in temperature.

Figure 3:
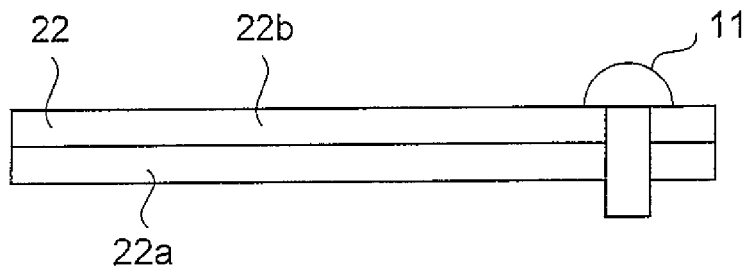
FIG. 3 is a side view of a diffusion-plate retainer of a display device of a second preferred embodiment of the present invention.

Next, FIG. 3 is a side view of a diffusion-plate retainer of a display device 1 according to a second preferred embodiment. A diffusion-plate retainer 22 of this preferred embodiment preferably includes a plurality of metal plates laid one after another. The other portions are preferably the same as in the first preferred embodiment.

The diffusion-plate retainer 22 preferably includes a metal plate 22a, exhibiting satisfactory slidability, and a metal plate 22b, exhibiting high rigidity, laid one after another, and the metal plate 22a is disposed in contact with the diffusion plate 10. This achieves the same effects as in the first preferred embodiment, and in addition, permits the diffusion plate 10, which expands due to a rise in temperature, and the diffusion-plate retainers 22 to slide easily. The metal plates 22a, 22b may be formed of a metal compound, for example.

Figure 4:
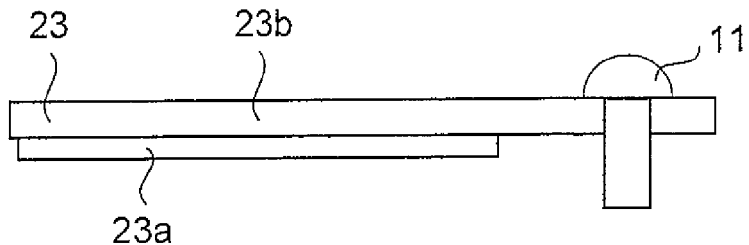
FIG. 4 is a side view of a diffusion-plate retainer of a display device of a third preferred embodiment of the present invention.

Next, FIG. 4 is a side view of a diffusion-plate retainer of a display device 1 according to a third preferred embodiment. A diffusion-plate retainer 23 of this preferred embodiment is formed by making a resin sheet 23a adhering to a metal plate 23b. The other portions are preferably the same as in the first preferred embodiment.

The diffusion-plate retainer 23 has a resin sheet 23a, exhibiting satisfactory slidability, and a metal plate 23b, exhibiting high rigidity, laid one after another, and the resin sheet 23a is disposed in contact with the diffusion plate 10. This achieves the same effects as in the first preferred embodiment, and in addition, permits the diffusion plate 10, which expands due to a rise in temperature, and the diffusion-plate retainer 23 to slide easily. The entire diffusion-plate retainer 23 may be formed of resin having great rigidity, or the metal plate 23b may be formed of metal compound.

Figure 5:
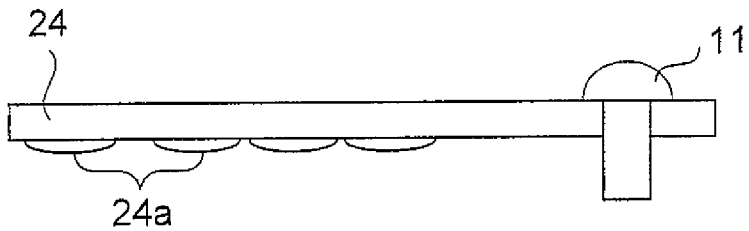
FIG. 5 is a side view of a diffusion-plate retainer of a display device of a fourth preferred embodiment of the present invention.

Next, FIG. 5 is a side view of a diffusion-plate retainer of a display device 1 according to a fourth preferred embodiment. A diffusion-plate retainer 24 of this preferred embodiment is preferably made of a metal or metal compound plate, and a surface thereof preferably includes a plurality of protruding portions 24a formed by a drawing process or other suitable process, for example. The other portions are preferably the same as in the first preferred embodiment.

The protruding portions 24a of the diffusion-plate retainer 24 each have a curved surface thereof extending in a direction perpendicular or substantially perpendicular to a plane of the paper, and the protruding portions 24a make line contact with the diffusion plate 10. This achieves the same effects as in the first preferred embodiment, and in addition, permits the diffusion plate 10, which expands due to a rise in temperature, and the diffusion-plate retainer 24 to slide easily. The protruding portions 24a may also be arranged so as to make point contact with the diffusion plate 10.

Figure 6:
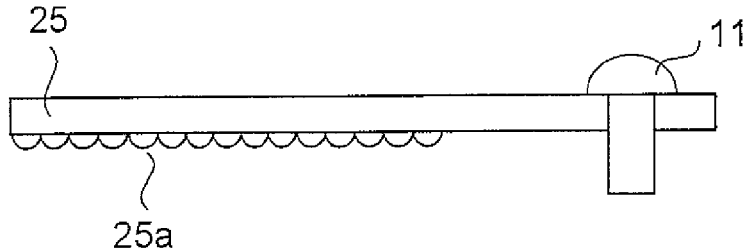
FIG. 6 is a side view of a diffusion-plate retainer of a display device of a fifth preferred embodiment of the present invention.

Next, FIG. 6 is a side view of a diffusion-plate retainer of a display device 1 according to a fifth preferred embodiment. A diffusion-plate retainer 25 of this preferred embodiment is preferably made of a metal or metal compound plate having a surface thereof formed with a number of protruding portions 25a. The other portions are preferably the same as in the first preferred embodiment.

The protruding portions 25a of the diffusion-plate retainer 25 are preferably formed by a drawing process or other suitable process, and each of the protruding portions 25a is extremely small, and makes point contact with the diffusion plate 10. This achieves the same effects as in the first preferred embodiment, and in addition, permits the diffusion plate 10, which expands due to a rise in temperature, and the diffusion-plate retainer 25 to slide easily. The protruding portions 25a may also be arranged to make line contact with the diffusion plate 10.

Figure 7:
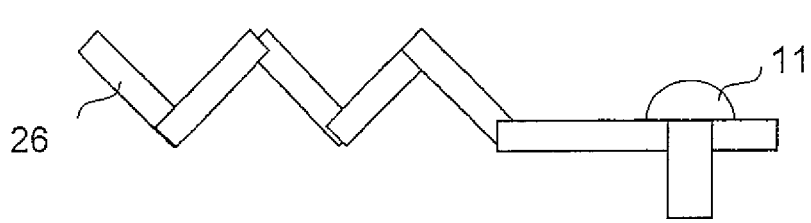
FIG. 7 is a side view of a diffusion-plate retainer of a display device of a sixth preferred embodiment of the present invention.

Next, FIG. 7 is a side view of a diffusion-plate retainer of a display device 1 according to a sixth preferred embodiment. A diffusion-plate retainer 26 of this preferred embodiment is preferably made of a metal or metal compound plate, and is formed by bending a portion thereof in a wavy shape. The other portions are preferably the same as in the first preferred embodiment.

The diffusion-plate retainer 26 preferably includes a wavy-shaped portion thereof, extending in a direction perpendicular or substantially perpendicular to a plane of the paper, and making line contact with the diffusion plate 10. This achieves the same effects as in the first preferred embodiment, and in addition, permits the diffusion plate 10, which expands due to a rise in temperature, and the diffusion-plate retainer 26 to slide easily.

Figure 8:
FIG. 8 is a side view of a diffusion-plate retainer of a display device of a seventh preferred embodiment of the present invention.

Next, FIG. 8 is a side view of a diffusion-plate retainer of a display device 1 according to a seventh preferred embodiment. A diffusion-plate retainer 27 of this preferred embodiment is preferably made of a metal or metal compound plate and, at an end portion thereof, is provided with a roller 27a. The other portions are preferably the same as in the first preferred embodiment.

The roller 27a of the diffusion-plate retainer 27 is rotated around a shaft that is arranged perpendicularly or substantially perpendicularly to a plane of the paper, and the roller 27a makes line contact with the diffusion plate 10. This achieves the same effects as in the first preferred embodiment, and in addition, rotation of the roller 27a permits the diffusion plate 10, which expands due to a rise in temperature, and the diffusion-plate retainer 27 to slide easily. The roller 27a may be formed in a spherical shape, which is rotatable, to make point contact with the diffusion plate 10.

Figure 9:
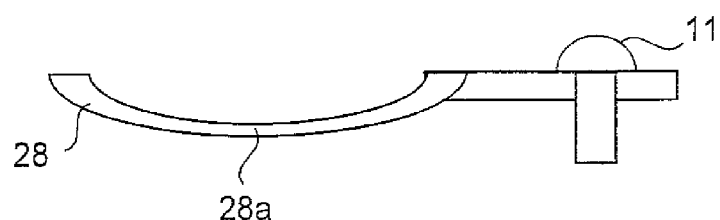
FIG. 9 is a side view of a diffusion-plate retainer of a display device of an eighth preferred embodiment of the present invention.

Next, FIG. 9 is a side view of a diffusion-plate retainer of a display device 1 according to an eighth preferred embodiment. A diffusion-plate retainer 28 of this preferred embodiment preferably includes a bent portion 28a thereof formed by bending a metal or metal compound plate by a drawing process or other suitable process. The other portions are preferably the same as in the first preferred embodiment.

The bent portion 28a of the diffusion-plate retainer 28 preferably includes a curved surface extending in a direction perpendicular or substantially perpendicular to a plane of the paper, and makes line contact with the diffusion plate 10. The diffusion plate 10 is free at one end thereof, and is thus elastically deformed so as to press the diffusion plate 10. That is, the bent portion 28a defines an urging member arranged to provide an urging force to urge the diffusion plate 10. The bent portion 28a, with its elastic force, can press against warpage of the diffusion plate 10 caused by heat, so that the diffusion plate 10 is dimensioned to be slidable. Thus, it is possible to obtain the same effects as in the first preferred embodiment.

Moreover, a pressing force produced by the diffusion-plate retainer 28 pressing the diffusion plate 10 has a small dependence on a screwing force of the screw 11, and has a large dependence on the elastic force of the bent portion 28a. The elastic force of the bent portion 28a can be made uniform easily thanks to its shape, helping reduce a variation in the pressing force of the diffusion-plate retainer 28, and making it possible to surely prevent warpage of the diffusion plate 10.

Figure 10:
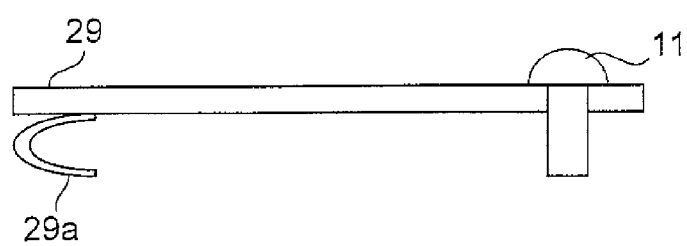
FIG. 10 is a side view of a diffusion-plate retainer of a display device of a ninth preferred embodiment of the present invention.

Next, FIG. 10 is a side view of a diffusion-plate retainer of a display device 1 according to a ninth preferred embodiment. A diffusion-plate retainer 29 of this preferred embodiment is preferably made of a metal or metal compound plate and, at an end portion thereof, has a bent portion 29a, which is made of metal compound or resin and formed by being bent, firmly fixed thereto. The other portions are preferably the same as in the first preferred embodiment.

The bent portion 29a of the diffusion-plate retainer 29 preferably includes a curved surface extending in a direction perpendicular or substantially perpendicular to a plane of the paper, and makes line contact with the diffusion plate 10. The bent portion 29a is free at one end thereof, and is elastically deformed so as to press the diffusion plate 10. That is, the bent portion 29a defines an urging member arranged to provide an urging force to urge the diffusion plate 10. The bent portion 29a, with its elastic force, can press against warpage of the diffusion plate 10 caused by heat, so that the diffusion plate 10 is dimensioned to be slidable.

Thus, it is possible to obtain the same effects as in the first preferred embodiment. The bent portion 29a, whose elastic force can easily be made uniform, helps reduce a variation in the pressing force of the diffusion-plate retainer 29, thus making it possible to surely prevent warpage of the diffusion plate 10.

Figure 11:
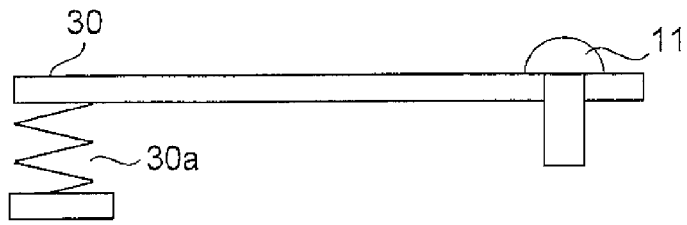
FIG. 11 is a side view of a diffusion-plate retainer of a display device of a tenth preferred embodiment of the present invention.

Next, FIG. 11 is a side view of a diffusion-plate retainer of a display device 1 according to a tenth preferred embodiment. A diffusion-plate retainer 30 of this preferred embodiment is preferably made of a metal or metal compound plate and, at an end portion thereof, has a compression spring 30a firmly fixed thereto. The other portions are preferably the same as in the first preferred embodiment.

The compression spring 30a, at an end thereof, is provided with a contact portion 30b that includes a flat plate, and the contact portion 30b makes contact with the diffusion plate 10. With the compression spring 30a being elastically deformed, the diffusion-plate retainer 30 presses the diffusion plate 10. That is, the compression spring 30a defines an urging member arranged to provide an urging force to urge the diffusion plate 10. The compression spring 30a, with its elastic force, can press against warpage of the diffusion plate 10 caused by heat, so that the diffusion plate 10 is dimensioned to be slidable.

Thus, it is possible to obtain the same effects as in the first preferred embodiment. Moreover, the compression spring 30a, whose elastic force can easily be made uniform, helps reduce a variation in the pressing force of the diffusion-plate retainer 30, thus making it possible to surely prevent warpage of the diffusion plate 10.

Figure 12:
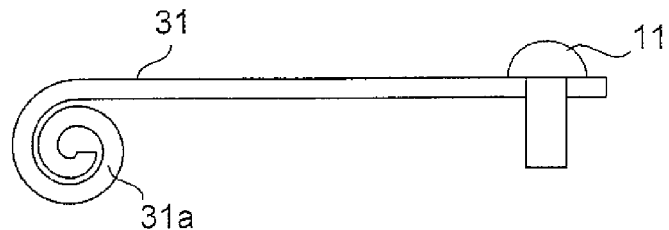
FIG. 12 is a side view of a diffusion-plate retainer of a display device of an eleventh preferred embodiment of the present invention.

Next, FIG. 12 is a side view of a diffusion-plate retainer of a display device 1 according to an eleventh preferred embodiment. A diffusion-plate retainer 31 of this preferred embodiment is preferably made of a metal or metal compound plate, and is provided with a spiral portion 31a thereof defined by winding an end portion thereof in a spiral manner. The other portions are preferably the same as in the first preferred embodiment.

The spiral portion 31a is wound with a gap so as to be elastically deformable, and makes line contact with the diffusion plate 10. With the spiral portion 31a being elastically deformed, the diffusion-plate retainer 31 presses the diffusion plate 10. That is, the spiral portion 31a defines an urging member arranged to provide an urging force to the diffusion plate 10. The spiral portion 31a, with its elastic force, can press against warpage of the diffusion plate 10 caused by heat, so that the diffusion plate 10 is dimensioned to be slidable.

Thus, it is possible to obtain the same effects as in the first preferred embodiment. Moreover, the spiral portion 31a, whose elastic force can easily be made uniform, helps reduce a variation in the pressing force of the diffusion-plate retainer 31, thus making it possible to surely prevent warpage of the diffusion plate 10.

Figure 13:
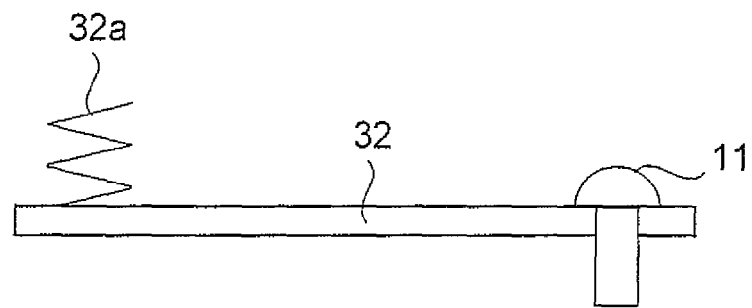
FIG. 13 is a side view of a diffusion-plate retainer of a display device of a twelfth preferred embodiment of the present invention.

Next, FIG. 13 is a side view of a diffusion-plate retainer of a display device 1 according to a twelfth preferred embodiment. A diffusion-plate retainer 32 of this preferred embodiment is preferably made of a metal or metal compound plate and, at an end portion thereof, has a compression spring 32a firmly fitted thereto. The other portions are preferably the same as in the first preferred embodiment.

Of the diffusion-plate retainer 32, the compression spring 32a comes into contact with the frame 8 (see FIG. 1), and a surface on a side opposite to the compression spring 32a makes contact with the diffusion plate 10. With the compression spring 32a being elastically deformed, the diffusion-plate retainer 32 presses the diffusion plate 10. That is, the compression spring 32a defines an urging member arranged to provide an urging force to the diffusion plate 10. The compression spring 32a, with its elastic force, can press against warpage of the diffusion plate 10, so that the diffusion plate 10 is dimensioned to be slidable.

Thus, it is possible to obtain the same effects as in the first preferred embodiment. Moreover, the compression spring 32a, whose elastic force can easily be made uniform, helps reduce a variation in the pressing force of the diffusion-plate retainer 32, thus making it possible to surely prevent warpage of the diffusion plate 10.

Figure 14:
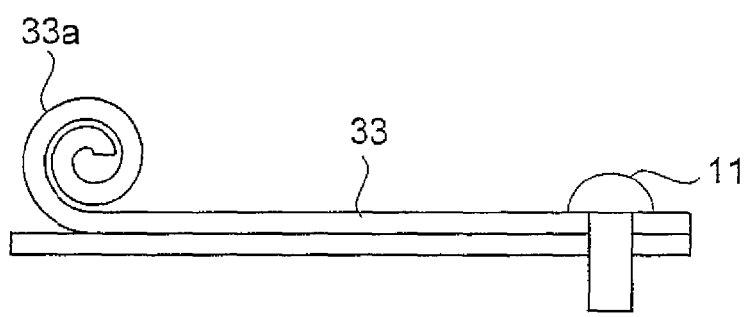
FIG. 14 is a side view of a diffusion-plate retainer of a display device of a thirteenth preferred embodiment of the present invention.

Next, FIG. 14 is a side view of a diffusion-plate retainer of a display device 1 according to a thirteenth preferred embodiment. A diffusion-plate retainer of this preferred embodiment is preferably made of a metal or metal compound plate, and is provided with a spiral portion 33a thereof defined by winding an end portion thereof in a spiral manner. The other portions are preferably the same as in the first preferred embodiment.

The spiral portion 33a is preferably wound with a gap so as to be elastically deformable. Of the diffusion-plate retainer 33, the spiral portion 33a comes into contact with the frame 8 (see FIG. 1), and a surface on a side opposite to the spiral portion 33a makes contact with the diffusion plate 10. With the spiral portion 33a being elastically deformed, the diffusion-plate retainer 33 presses the diffusion plate 10. That is, the spiral portion 33a defines an urging member arranged to provide an urging force to the diffusion plate 10. The spiral portion 33a, with its elastic force, can press against warpage of the diffusion plate 10 caused by heat, so that the diffusion plate 10 is dimensioned to be slidable.

Thus, it is possible to obtain the same effects as in the first preferred embodiment. Moreover, the spiral portion 33a, whose elastic force can easily be made uniform, helps reduce a variation in the pressing force of the diffusion-plate retainer 33, thus making it possible to surely prevent warpage of the diffusion plate 10.

Figure 15:
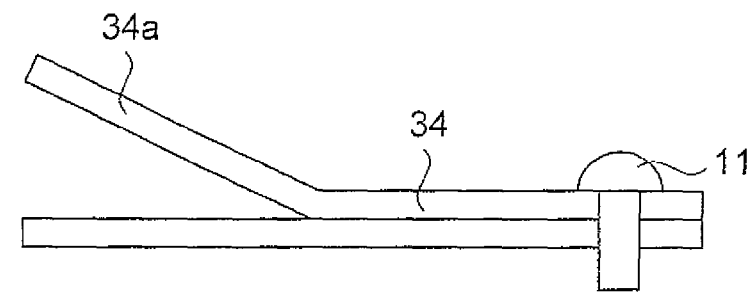
FIG. 15 is a side view of a diffusion-plate retainer of a display device of a fourteenth preferred embodiment of the present invention.
Figure 16A:
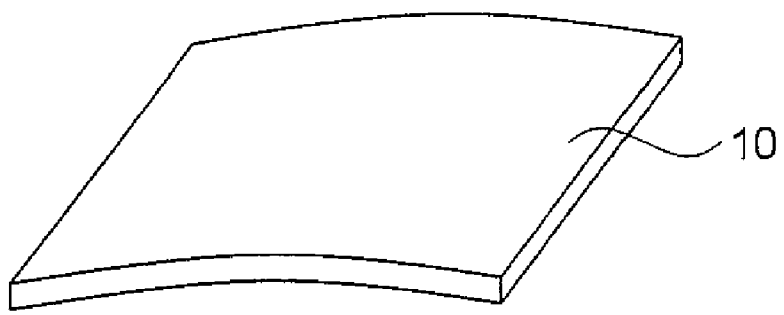
FIGS. 16A and 16B are perspective views showing how the diffusion plate is warped.
Figure 16B:
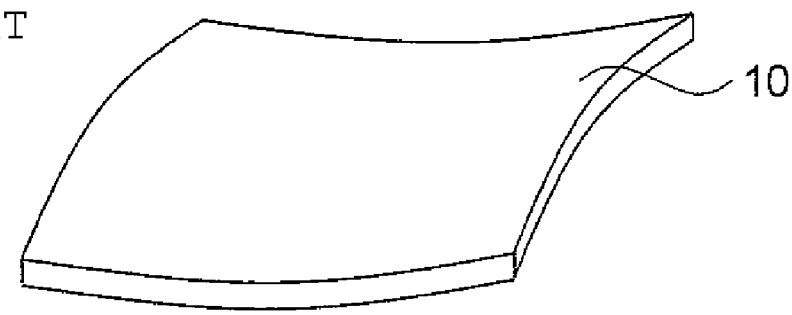

Next, FIG. 15 is a side view of a diffusion-plate retainer of a display device according to a fourteenth preferred embodiment. A diffusion-plate retainer 34 of this preferred embodiment preferably includes a plurality of metal or metal compound plates laid one after another, and includes a bent portion 34a preferably formed by bending a metal plate disposed at the top. The other portions are preferably the same as in the first preferred embodiment.

With the diffusion-plate retainer 34, the bent portion 34a comes into contact with the frame 8 (see FIG. 1), and a surface on a side opposite to the bent portion 34 makes contact with the diffusion plate 10. With the bent portion 34a, which preferably includes a leaf spring, being elastically deformed, the diffusion-plate retainer 34 presses the diffusion plate 10. That is, the bent portion 34a defines an urging member arranged to provide an urging force to the diffusion plate 10. The bent portion 34a, with its elastic force, can press against warpage of the diffusion plate 10 caused by heat, so that the diffusion plate 10 is dimensioned to be slidable.

Thus, it is possible to obtain the same effects as in the first preferred embodiment. Moreover, the bent portion 34a, whose elastic force can easily be made uniform, helps reduce a variation in pressing force of the diffusion-plate retainer 34, thus making it possible to surely prevent warpage of the diffusion plate 10.

In the first to the fourteenth preferred embodiments, it is preferable that at least surfaces of the diffusion-plate retainers 21 to 34 on a side of the display panel 2 be painted in whitish or black color. More specifically, in a case where the diffusion-plate retainers 21 to 34 have the surfaces painted in whitish color, it is possible to prevent the diffusion-plate retainers 21 to 34 from being reflected in images on the display screen D when viewed from a oblique direction. Thus, it is possible to prevent degradation of an image quality. Examples of the whitish color include not only white but also light yellow and the like.

In addition, in a case where the diffusion-plate retainers 21 to 34 have the surfaces painted in white color, it is possible to make light emitted from the diffusion plate in an oblique direction reflected by the diffusion-plate retainers 21 to 34. Thus, it is possible to use illumination light of the illumination apparatus 3 more effectively.

Moreover, in a case where the diffusion-plate retainers 21 to 34 have the surfaces pained in black color, even if the diffusion-plate retainers 21 to 34 are reflected in images on the display screen D when viewed from an oblique direction, such reflection appears uniform with an outside of the display screen D. Thus, it is possible to prevent degradation of an image quality.

Preferred embodiments of the present invention are applicable to a display device equipped with a diffusion plate facing a display panel such as a liquid crystal panel.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
   a light source;
   a diffusion plate arranged to diffuse light emitted from the light source;
   a supporting base arranged to support the diffusion plate;
   an optical sheet disposed on the diffusion plate;
   a diffusion-plate retainer fitted to the supporting base and arranged to sandwich the diffusion plate with the supporting base by pressing the diffusion plate while avoiding the optical sheet; and
   a display panel facing the diffusion plate; wherein
   the diffusion plate is arranged to be slidable relative to the diffusion-plate retainer.

2. The display device according to claim 1, wherein a portion of the diffusion-plate retainer that makes contact with the diffusion plate is made of resin.

3. The display device according to claim 1, wherein the diffusion-plate retainer is arranged to make line or point contact with the diffusion plate.

4. The display device according to claim 3, wherein the diffusion-plate retainer includes a rotatable roller arranged to make contact with the diffusion plate.

5. The display device according to claim 1, wherein the diffusion-plate retainer is made of metal or metal compound.

6. The display device according to claim 1, wherein the diffusion-plate retainer has a surface thereof painted in whitish or black color.

7. The display device according to claim 1, wherein the diffusion-plate retainer includes an urging member arranged to provide an urging force in a direction of pressing the diffusion plate.

8. The display device according to claim 1, further comprising an optical-sheet retainer fitted to the supporting base at a position different from a position of the diffusion-plate retainer, wherein the diffusion plate and the optical sheet are sandwiched between the supporting base and the optical-sheet retainer, and a pressing force of the optical-sheet retainer is smaller than a pressing force of the diffusion-plate retainer.

9. A television receiver comprising the display device according to claim 1.

* * * * *